(12) United States Patent
Knowles et al.

(10) Patent No.: US 6,720,706 B2
(45) Date of Patent: Apr. 13, 2004

(54) REDUCED COMPONENT DRIVE CIRCUIT

(76) Inventors: Gareth J. Knowles, 4121 Jacks Hollow Rd., Willamsport, PA (US) 17702; Bruce Bower, 4121 Jacks Hollow Rd., Wiliamsport, PA (US) 17702; John Murray, 79 Smithtown Polk Blvd., Centereach, NY (US) 11720

( * ) Notice: Subject to any disclaimer, the term of this patent is extended or adjusted under 35 U.S.C. 154(b) by 228 days.

(21) Appl. No.: 10/074,766

(22) Filed: Feb. 12, 2002

(65) Prior Publication Data

US 2002/0140317 A1 Oct. 3, 2002

Related U.S. Application Data

(60) Provisional application No. 60/268,096, filed on Feb. 12, 2001.

(51) Int. Cl.[7] ................................................ H01L 41/08
(52) U.S. Cl. .................................. 310/319; 310/316.01
(58) Field of Search ........................... 310/316.01, 317, 310/319; 318/116–118

(56) References Cited

U.S. PATENT DOCUMENTS

| | | | |
|---|---|---|---|
| 5,479,062 A | 12/1995 | Yoshino | |
| 5,923,542 A * | 7/1999 | Sasaki et al. | 363/16 |
| 6,008,564 A | 12/1999 | Takayoshi et al. | |
| 6,028,388 A | 2/2000 | Shimada | |
| 6,078,124 A * | 6/2000 | Furuhashi et al. | 310/318 |
| 6,144,139 A * | 11/2000 | Noma et al. | 310/316.01 |
| 6,184,631 B1 * | 2/2001 | Noma et al. | 315/224 |
| 6,239,558 B1 * | 5/2001 | Fujimura et al. | 315/307 |
| 6,246,153 B1 | 6/2001 | Bishop et al. | |
| 6,268,681 B1 * | 7/2001 | Yamaguchi et al. | 310/316.01 |
| 6,400,096 B1 * | 6/2002 | Wells et al. | 315/224 |
| 6,639,367 B2 * | 10/2003 | Wells et al. | 315/224 |

* cited by examiner

*Primary Examiner*—Mark Budd
(74) *Attorney, Agent, or Firm*—Michael G. Crilly, Esq.

(57) ABSTRACT

The present invention is a power conditioning circuit. The invention is comprised of multiple comparators and a bilateral switch. The invention converts the high-frequency, high-voltage output signal from a piezoelectric transformer to a desired low-frequency voltage signal, examples including but not limited to sinusoidal, sawtooth, ramp, and square waves, at the output amplitude voltage. The circuit switches the high-frequency AC output, also referred to as the driving waveform, into the load at precisely the instant when the driving waveform crosses the present voltage load value, and switches it out when the load waveform reaches the desired voltage. Thereafter, the switch is opened and the reactance of the load or an additional output capacitor element holds the voltage until the next switching cycle.

11 Claims, 8 Drawing Sheets

*Prior Art*

REDUCED COMPONENT DRIVE CIRCUIT

CROSS REFERENCE TO RELATED APPLICATIONS

The application claims benefit under 35 U.S.C. 119(e) from U.S. Provisional Application No. 60/268,096 filed on Feb. 12, 2001.

FEDERALLY SPONSORED RESEARCH OR DEVELOPMENT

None.

BACKGROUND OF THE INVENTION

1. Field of the Invention

The present invention generally relates to a circuit capable of driving electrical loads. The invention specifically described is a circuit that develops a commanded DC or AC signal from the high-frequency AC output voltage of a piezoelectric transformer.

2. Related Arts

Figure 1A:
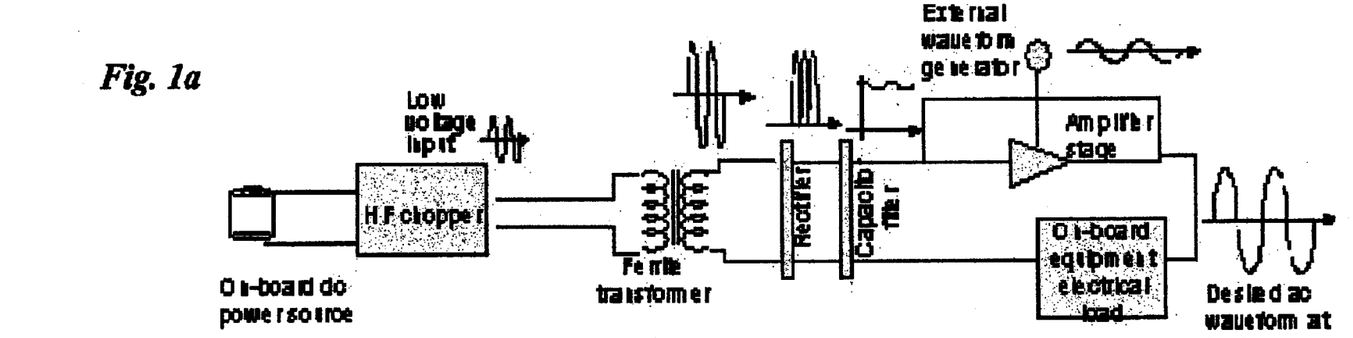
FIG. 1 describes power distribution schemes found in the related arts.

A conventional power distribution circuit, as shown in FIG. 1a, steps-up and steps-down AC voltage via an electromagnetic transformer wherein primary and secondary windings are electromagnetically coupled to a magnetic core. Both windings and magnetic core limit miniaturization of such devices.

Figure 1B:
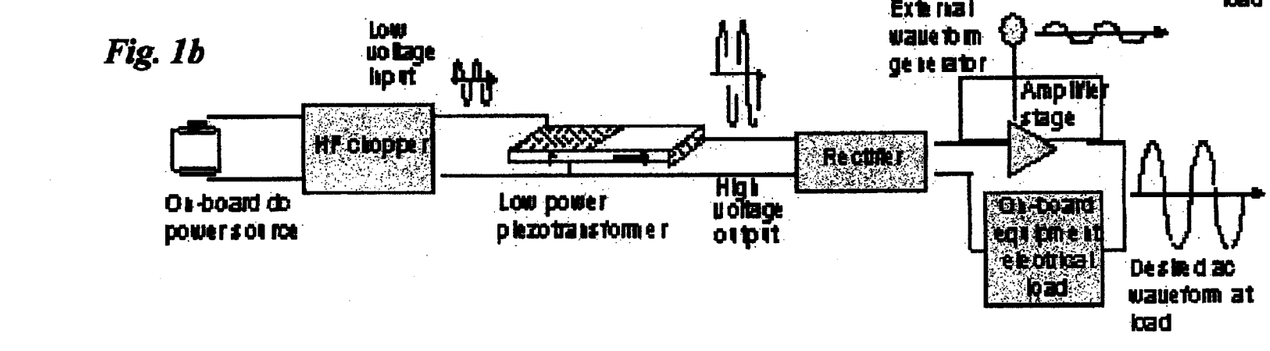

A conventional piezotransformer-based distribution circuit, as shown in FIG. 1b, also provides for voltage step-up and step-down. More specifically, a Rosen transformer excites a piezoelectric element at resonance frequency with an electrical input at one end of the element generating a mechanical vibration, thereafter converting mechanical vibrations into electrical voltage at a second end of the element. Piezoelectric transformers are smaller, lighter, and more efficient than conventional electromagnetic devices, however constrained to a limited operating frequency below that of electromagnetic transformers.

Higher frequency piezoelectric transformers are possible. Such devices achieve both higher operating frequency and higher power density than conventional Rosen transformers via a thickness extensional vibration mode. The resultant device operates at multiple voltage levels, since output voltage is dependent on the thickness ratio between individual layers along first and second ends of the piezoelectric element.

The output from a piezoelectric transformer has parallel capacitance and a capacitive load. Therefore, neither output nor load are directly switchable into the other except with an intervening element, typically an inductor to maintain efficiency. The related arts transform the high-frequency output from a piezoelectric transformer to DC voltage via a bridge rectifier and a fairly large capacitor. DC voltage is applied as a power supply for a switching amplifier to drive the load, again requiring a filter inductor, an inverter circuit and a feedback circuit.

Much of the complexity, bulk, and weight in the related arts is avoided by switching the high-frequency AC output from the piezoelectric transformer, also called the driving waveform, into the load at precisely the instant when the driving waveform crosses the present voltage value on the load and switching the load out when the driving waveform reaches the desired voltage. Thereafter, the switch is opened and the reactance of the load or an addition output capacitor element holds the voltage until the next switching cycle. A single bilateral switch is required.

An object of the present invention is to provide a smaller, lighter, and less complex circuit capable of driving electrical loads. A further object of the present invention is to provide a circuit capable of developing an AC voltage signal input from the high-frequency AC output of a piezoelectric transformer without capacitors or inverter.

SUMMARY OF THE INVENTION

The present invention is a drive circuit functionally distinct from conventional linear and switching drives and representing a new device called a trasversion or transconverter device. The invention is comprised of several high-frequency comparators and at least one bilateral switch. The invention converts one or more high-frequency output voltage signals from a piezoelectric transformer to low-frequency voltage signals, examples including but not limited to sinusoidal, sawtooth, ramp, and square waves, at the output amplitude voltage. The circuit switches a high-frequency AC voltage output from a piezoelectric transformer, also referred to as the driving waveform, into the load at precisely the instant when the driving waveform crosses the present voltage value on the load, and switches it out when the driving waveform reaches the desired voltage. Thereafter, the switch is opened and the reactance of the load or an additional output capacitor element holds the voltage until the next switching cycle. The circuit functions without inverter and regulation sections required in the related arts.

The circuit is applicable to various piezoelectric transformer sections wherein a high-voltage AC signal and a low-level supply are separately provided. For example, the present invention is applicable to a conventional piezoelectric transformer, a piezoelectric transformer coupling with high-level and low-level "winding" outputs, and a dual piezoelectric transformer.

Several advantages are offered by the present invention. The invention is smaller, lighter, less costly, and more reliable than the related arts due to the elimination of iron core/ferrite transformer and amplifier. The invention eliminates large capacitors and invert section in the related arts. The invention is a modular design readily adaptable to a wide range of current-voltage output characteristics and waveforms. The invention generates an extremely low EMI/RFI signature and has a wide thermal excursion operating capability. The invention is widely applicable in such items as flourescent lighting systems, backlit lighting systems, computer electronics, and active materials and devices.

BRIEF DESCRIPTION OF THE DRAWINGS

The invention will now be described in more detail, by way of example only, with reference to the accompanying drawings, in which.

NUMERICAL REFERENCE

1 Power source
2 Piezoelectric transformer
3 Drive circuit
4 Input side
5 Output side
6 High-frequency signal
7 Reference waveform
8 Output signal
10 Comparator circuit
12 Power distribution system
20 Power supply
21 Bulk converter
22 power storage element
23 dedicated element
24 Output side connection
25 AC generator
26 piezotransformer
27 Drive circuit
28 Supply power waveform
29 High-frequency signal
30 Output signal
50 Crossover point
51 Leading edge segment
52 Trailing edge segment
53 Desired voltage waveform
54 High-frequency AC signal
61 Reference voltage
62 Actual voltage
63 Actual voltage
64 Crossover point
65 Trailing edge segment
67 Desire voltage waveform
68 High-frequency DC signal
69 Actual voltage
X1 Comparator
X2 Comparator
X3 Comparator
X4 Comparator
L1 Load
S1 Switch
S2 Switch

DESCRIPTION OF THE INVENTION

The present invention facilitates AC rectification, as well as DC rectification of AC or DC power. The described invention is quite distinct from the related arts where rectification is provided on the output side only. Multiple transconverters supply both separate AC voltage signals and DC voltage signals using the same level-shifting piezoelectric transformer. Elimination of traditional passive filter components allows manufacture of the transconversion device as a foundry solid state component.

Figure 3:
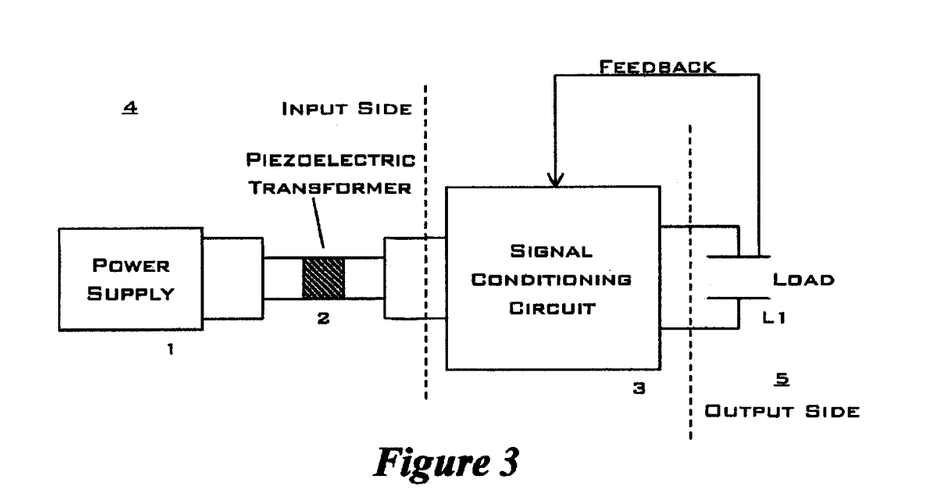
FIG. 3 is a block diagram showing signal conditioning circuit coupled to input and output elements.

FIG. 3 shows the present invention, namely a drive circuit 3, electrically coupled at an input side 4 to a power source 1 and a piezoelectric transformer 2, and at an output side 5 to one or more loads L1. The power source 1 energizes a piezoelectric transformer 2 with a high-frequency, low voltage at one end thereby producing a high-frequency signal 6 with stepped-up voltage at the other end. A very-high-frequency chopper device conditions power from the power source 1. Power supplies and chopper devices comprising the power source 1 are readily understood by one in the art. Thereafter, the high-frequency signal 6 with stepped-up voltage is communicated to the drive circuit 3 where it is modified and electrically communicated to one or more loads L1 at the output side 5. Loads L1 include electrical devices as understood in the art, examples including capacitive and transductive elements.

Figure 2:
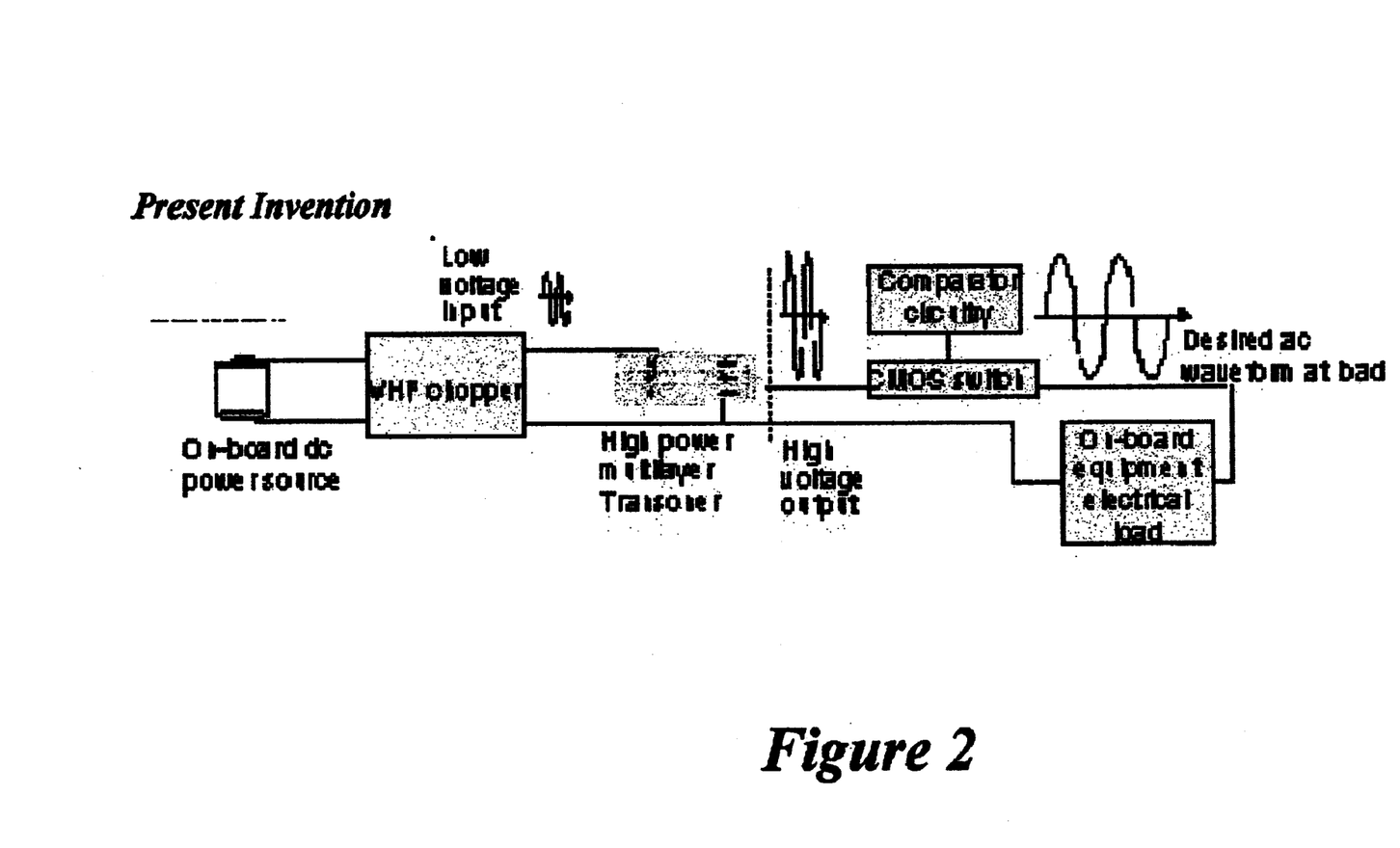
FIG. 2 is a schematic diagram showing present invention with piezoelectric transformer.

Conventional piezoelectric transformers 2 such as the TRANSONER® are manufactured by Face International Corporation of Norfolk, Va. The self-contained implementation of the invention requires either a multi-tap piezoelectric transformer 2 or two separate piezoelectric transformers 2. FIG. 2 provides a block diagram for the present invention coupled to a multi-tap piezoelectric transformer 2.

Figure 4:
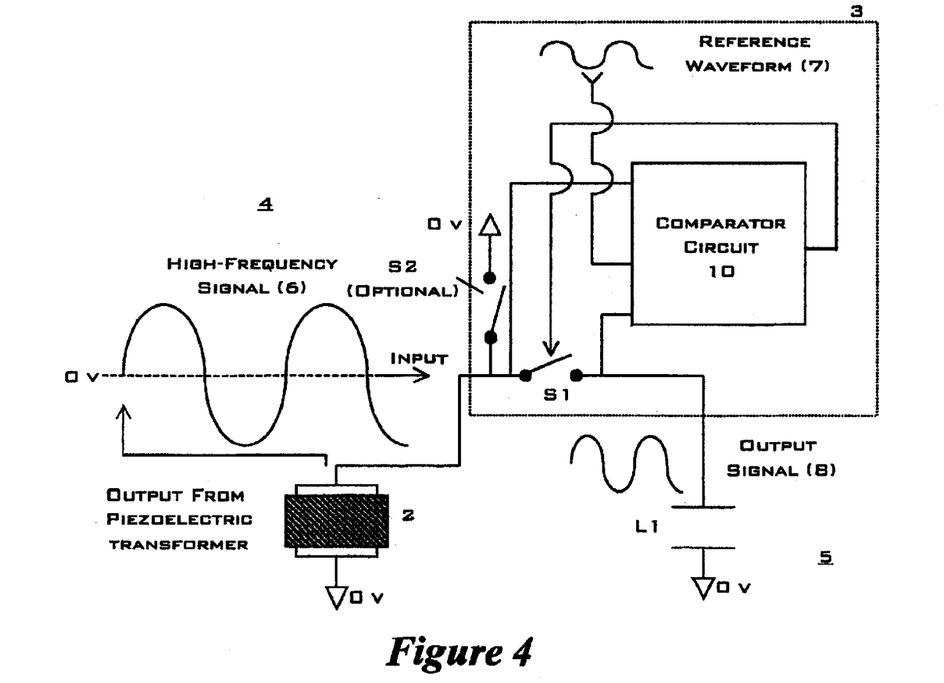
FIG. 4 is a functional description of the present invention.

FIG. 4 graphically describes functionality of the drive circuit 3. In this example, the drive circuit 3 is comprised of a comparator circuit 10 composed of a plurality of comparators electrically arranged and connected and thereafter electrically connected about a bidirectional switch S1. The comparator circuit 10 is comprised of signed components thereby facilitating both stepwise increase and decrease of voltage into the load L1. The comparator circuit 10 is electrically connected to a switch S1 regulating current flow from the piezoelectric transformer 2 to the load L1. An optional second switch S2 is provided to dump charge from the load L1. Dual switch S1, S2 embodiments are driven in opposite phase and charge direction relative to the load L1.

Drive circuit 3 generates an output signal 8 having the form of a reference waveform 7 by selectively passing portions of the high-frequency signal 6 from the piezoelectric transformer 2 to the load L1. The comparator circuit 10 receives voltage data about the switch S1 and compares this to the reference waveform 7. The comparator circuit 10 OPENS and CLOSES the switch S1, referred to as the condition, thereby passing only that portion of the high-frequency signal 6 required to increase or decrease voltage as desired in the output signal 8.

Figure 5:
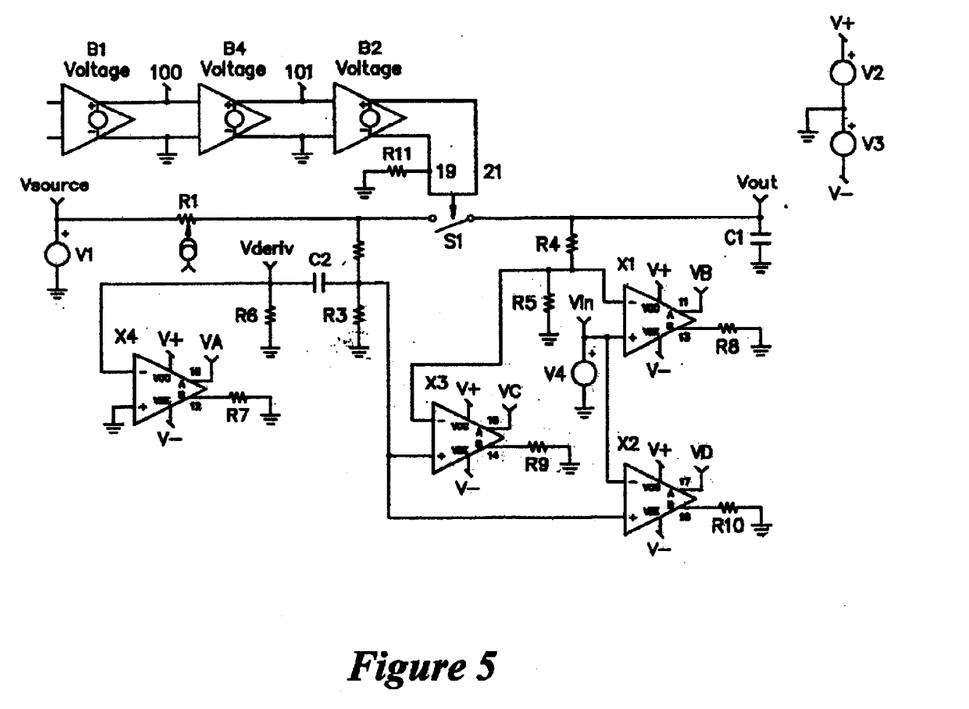
FIG. 5 is a circuit diagram showing preferred embodiment comprised of four analog comparators and a MOSFET switch.

FIG. 5 shows a four comparator X1, X2, X3, X4 embodiment of the drive circuit 3. Switch S1 condition is controlled by a standard TTL or CMOS circuit with comparator X1, X2, X3, X4 outputs, namely VA, VB, VC, and VD as inputs, and the switch S1 drive signal as output. Switch S1 condition is determined from four parameters. First, whether the next voltage along the output signal 8, for example gain times reference signal 7, is higher or lower than the present voltage along the output signal 8. Second, whether the high-frequency signal 6 crosses the next voltage. Third, whether the high-frequency signal 6 crosses the present voltage. Fourth, whether the high-frequency signal 6 is increasing or decreasing.

High-speed sampling by the comparators X1, X2, X3, X4 is required to identify all four conditions. The first three parameters are determined using the corresponding voltages as inputs to the comparators X1, X2, X3. In practice, the desired output voltage is determined by the input voltage, and the high-frequency signal 6 and the present voltage are divided down to the same level. Voltage dividers determine the voltage gain of the amplifier, while the maximum output of the high-frequency signal 6 determines amplitude. The fourth parameter is determined by passing the high-frequency signal 6 through an attenuating differentiator, preferable filtering high-frequency noise, where the resulting waveform and zero are inputs to a fourth comparator X4. Table 1 summarizes representative values for components in FIG. 5.

Multi-tap piezoelectric transformer 2 embodiments include an AC signal as an input and a plurality of AC voltages as output. In preferred embodiments, a filter capacitor is provided at the output side 5 to maintain voltage between opening and closing of the switch S1. Drive circuit 3 components as well as single or dual MOSFET type switches S1, S2 are readily integratable at the foundry level. A wide range of voltage outputs are achievable by replacing the piezoelectric transformer 2.

The switch S1 may be comprised of a power MOSFET, a small floating power supply, an optocoupled driver, and four diodes, as shown in FIG. 5. Output from the piezoelectric transformer 2 is identified as V1 and consists of a sine wave.

Figure 6:
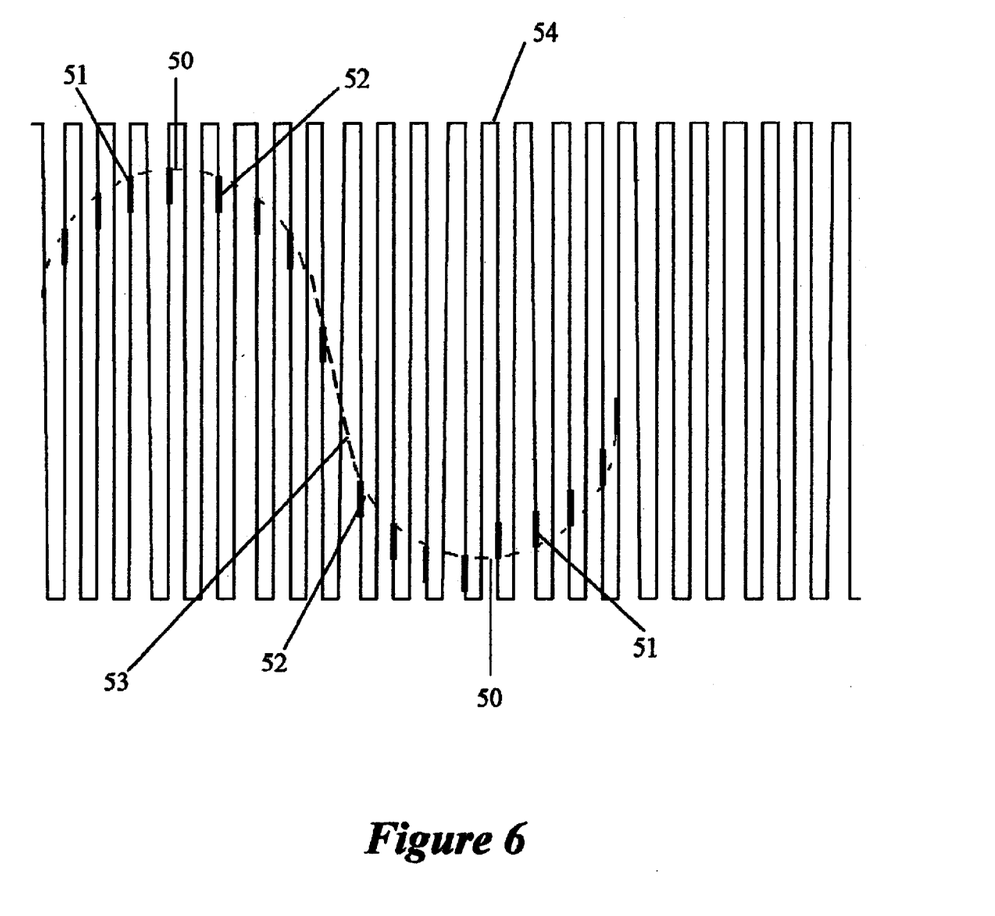
FIG. 6 illustrates transconversion of high-frequency AC voltage signal from a piezoelectric transformer to desired voltage signal at an electrical load.

FIG. 6 graphically describes the construction of a desired voltage waveform 53 from a high-frequency AC signal 54 generated by a piezoelectric transformer 2. The desired voltage waveform 53 is comprised of a rising portion and a falling portion about a crossover point 50. Rising portions of the desired voltage waveform 53 are produced by selecting the leading edge segment 51 from the high-frequency AC signal 54. Falling portions of the desired voltage waveform 53 are produced by selecting the trailing edge segment 52 from the high-frequency AC signal 54.

Figure 7:
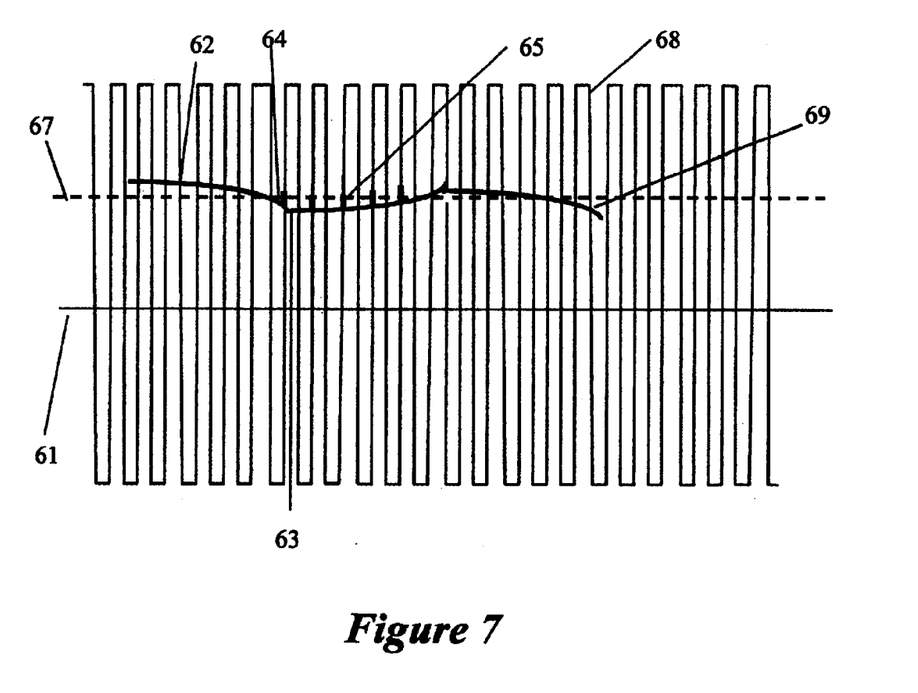
FIG. 7 illustrates transconversion of high-frequency DC voltage signal from a piezoelectric transformer to desired voltage signal at an electrical load.

FIG. 7 graphically describes the construction of a desired voltage waveform 67 from a high-frequency DC signal 68 generated by a piezoelectric transformer 2. Actual voltage 69 typically includes regions of the waveform within tolerance, actual voltage 62 in FIG. 7, and regions of the waveform out of tolerance, actual voltage 63 in FIG. 7, about a crossover point 64. When the waveform is out of tolerance, trailing edge segments 65 from the high-frequency AC signal 68 are selected to increase the load voltage.

Figure 8:
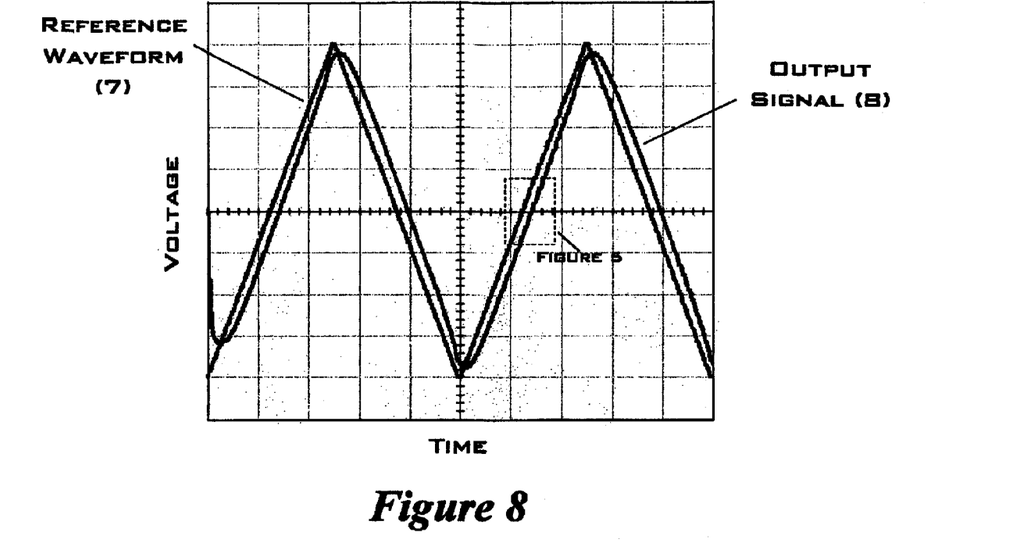
FIG. 8 is a voltage-time plot for output waveform from preferred embodiment.
Figure 9:
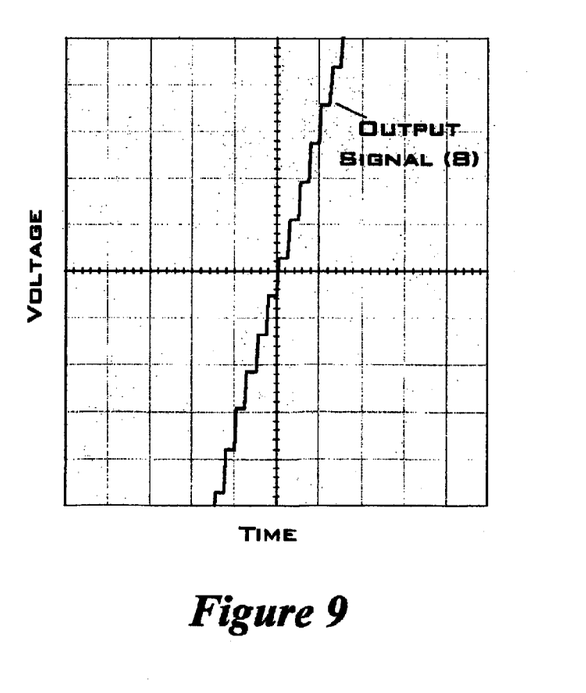
FIG. 9 is an enlarged view of voltage-time plot showing stepwise waveform.

FIG. 8 shows an exemplary output signal 8 generated from a high-frequency signal 6. FIG. 9 provides a detailed view of the output signal 8 highlighting the stepwise feature of the output voltage. Horizontal steps occur when the switch S1 is OPEN. Vertically increasing and decreasing steps result when switch S1 is CLOSED.

Figure 10:
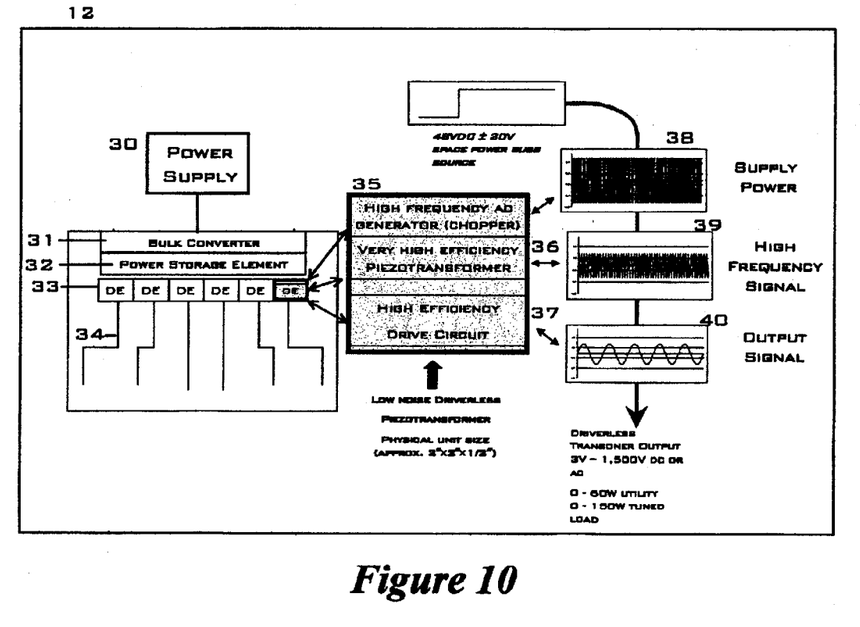
FIG. 10 is diagram showing a plurality of circuits arranged forming a single power distribution system.

FIG. 10 shows a block diagram comprised of a plurality of paired piezoelectric transformers 2 and circuits 3 forming a power distribution system 12. A power supply 20 generates, collects, or communicates power from one or more sources, including but not limited to thermal, photovoltaic, AC line and DC line, to a bulk converter 21 where it is converted to a clean DC level power, and thereafter communicated to a power storage element 22, one example including a battery. Thereafter, power is communicated to two or more dedicated elements 23. In an alternate embodiment, power is directly communicated from power supply 20 to dedicated elements 23.

Dedicated elements 23 are comprised of a high-frequency AC generator 35 which converts DC power from the storage element 32 or power supply 20 to AC power as shown by supply power waveform 28, a piezotransformer 26 which transforms the AC power as shown high-frequency signal 29, and a drive circuit 27 which modifies the signal from the piezotransformer 26 to an output signal 30 compatible with the power requirements of the end device. For example, the drive circuit 27 might modify the signal from the piezotransformer 26 to a sinusoidal, sawtooth, square or other wave required for use by an electrical device. Each dedicated element 23 uniquely provides for the power needs of a load L1 coupled to the output side connection 24 of the drive circuit 27.

The description above indicates that a great degree of flexibility is offered in terms of the present invention. Although embodiments have been described in considerable detail with reference to certain preferred versions thereof, other versions are possible. Therefore, the spirit and scope of the appended claims should not be limited to the description of the preferred versions contained herein.

TABLE 1

| Component | Description |
| --- | --- |
| Resistor R1 | 1,000 ohms |
| Resistor R2 | 100,000 ohms |
| Resistor R3 | 1,000 ohms |
| Resistor R4 | 100,000 ohms |
| Resistor R5 | 1,000 ohms |
| Resistor R6 | 1,000 ohms |
| Resistor R7 | 1,000 ohms |
| Resistor R8 | 1,000 ohms |
| Resistor R9 | 1,000 ohms |
| Resistor R10 | 1,000 ohms |
| Resistor R11 | 1,000,000 ohms |
| Capacitor C1 | 1 $\mu$F |
| Capacitor C2 | 1 pF |
| Comparator X1 | NE527, Phillips Semiconductors Co. |
| Comparator X2 | NE527, Phillips Semiconductors Co. |
| Comparator X3 | NE527, Phillips Semiconductors Co. |
| Comparator X4 | NE527, Phillips Semiconductors Co. |

What is claimed is:

1. A drive circuit rectifying DC and AC signals to drive an electrical load comprising:
    (a) a first bidirectional switch electrically connected at an input side to a piezoelectric transformer and at an output side to an electrical load; and
    (b) a comparator circuit electrically connected about said first bidirectional switch, said comparator circuit comparing a present voltage value at said electrical load and a desired voltage value at said output side, said comparator circuit closing said first bidirectional switch thereby directing a high-frequency signal from said piezoelectric transformer into said electrical load when said high-frequency signal crosses said present voltage value, said comparator circuit opening said first bidirectional switch when said high-frequency signal reaches said desired voltage value.

2. A drive circuit rectifying DC and AC signals to drive an electrical load comprising:
    (a) a first bidirectional switch electrically connected at an input side to a piezoelectric transformer and at an output side to an electrical load;
    (b) a comparator circuit electrically connected about said first bidirectional switch, said comparator circuit comparing a present voltage value at said electrical load and a desired voltage value at said output side, said comparator circuit closing said first bidirectional switch thereby directing a high-frequency signal from said piezoelectric transformer into said electrical load when said high-frequency signal crosses said present voltage value, said comparator circuit opening said first bidirectional switch when said high-frequency signal reaches said desired voltage value; and (c) a second bidirectional switch electrically connected at a first end between said piezoelectric transformer and said comparator circuit and terminated at a second end, said first bidirectional switch and said second bidirectional switch driven in opposite phase and charge direction relative to said electrical load.

3. The drive circuit of claim 2, wherein said second bidirectional switch is a MOSFET shunted full-wave bridge.

4. The drive circuit as in claim 1 or 2, further comprising a feedback circuit at said output side, said feedback circuit holding a voltage from said input side based on response to said output signal by said electrical load, said feedback circuit directing said voltage into said electrical load when said comparator circuit closes said first bidirectional switch.

5. The drive circuit of claim 4, wherein said electrical load is comprised of a capacitive element maintaining charge between switching instances.

6. The drive circuit of claim 4, wherein said electrical load is comprised of a transductive element and paralleled capacitive element, said capacitive element maintaining charge between switching instances.

7. The drive circuit of claim 4, wherein said piezoelectric transformer is a multi-tap device accepting an AC signal input and generating a plurality of AC voltages, said drive circuit further comprising a filter capacitor at said output side to maintain a voltage level at said output side during switching of said first bidirectional switch.

8. The drive circuit of claim 4, wherein said piezoelectric transformer is a multi-tap device accepting an AC signal input and generating a plurality of AC voltages.

9. The drive circuit of claim 4, wherein said first bidirectional switch is a MOSFET shunted full-wave bridge.

10. A power distribution system rectifying DC and AC signals to drive a plurality of electrical loads comprising:

(a) a power supply;

(b) a plurality of drive elements each electrically connected at a first end to said power supply and at a second end to an electrical load, each said drive element comprised of an AC generator electrically coupled to a piezotransformer electrically coupled to a drive circuit, said drive circuit comprised of a bidirectional switch electrically connected at an input side to said piezoelectric transformer and at an output side to said electrical load and a comparator circuit electrically connected about said bidirectional switch, said comparator circuit comparing a present voltage value at said electrical load and a desired voltage value along at said output side, said comparator circuit closing said bidirectional switch thereby directing a high-frequency signal from said piezoelectric transformer into said electrical load when said high-frequency signal crosses said present voltage value, said comparator circuit opening said bidirectional switch when said high-frequency signal reaches said desired voltage value.

11. A power distribution system rectifying DC and AC signals to drive a plurality of electrical loads comprising:

(a) a power supply;

(b) a bulk converter converting a power from said power supply to a level DC power;

(c) a power storage element storing said level DC power; and (d) a plurality of drive elements each electrically connected at a first end to said power storage element and at a second end to an electrical load, each said drive element comprised of an AC generator electrically coupled to a piezotransformer electrically coupled to a drive circuit, said drive circuit comprised of a bidirectional switch electrically connected at an input side to said piezoelectric transformer and at an output side to said electrical load and a comparator circuit electrically connected about said bidirectional switch, said comparator circuit comparing a present voltage value at said electrical load and a desired voltage value at said output side, said comparator circuit closing said bidirectional switch thereby directing a high-frequency signal from said piezoelectric transformer into said electrical load when said high-frequency signal crosses said present voltage value, said comparator circuit opening said bidirectional switch when said high-frequency signal reaches said desired voltage value.

* * * * *